Aug. 19, 1969  SOICHIRO MAKINO  3,461,592
CONDITION RESPONSIVE DEVICE
Filed May 18, 1966
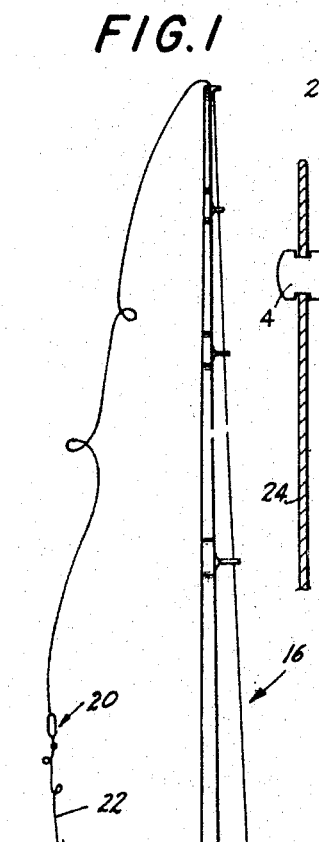
FIG.1
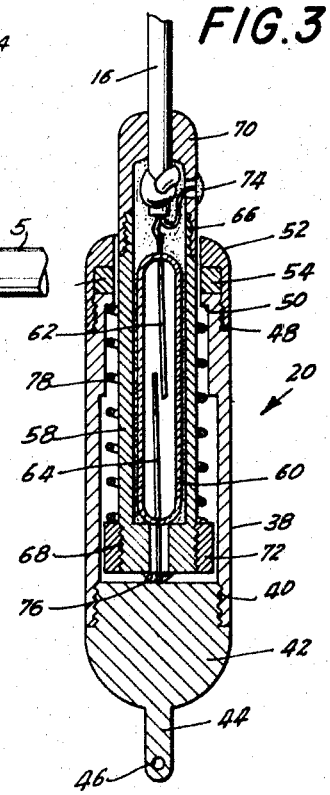
FIG.3
FIG.5
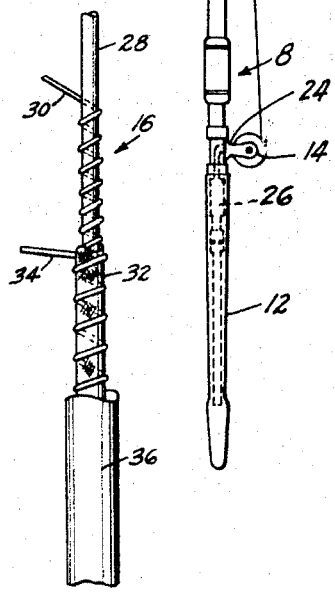
FIG.2
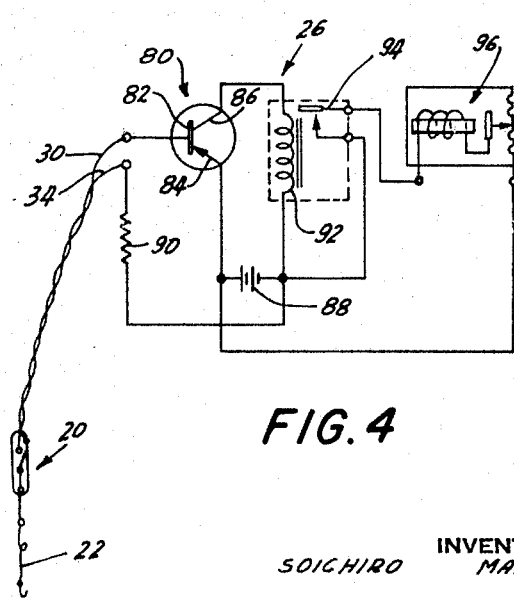
FIG.4
INVENTOR
SOICHIRO MAKINO
BY
Kane, Dalsimer, Kane & Smith
ATTORNEYS

United States Patent Office 3,461,592
Patented Aug. 19, 1969

3,461,592
CONDITION RESPONSIVE DEVICE
Soichiro Makino, 68 1-Chome Higashima-chi,
Koganei-shi, Tokyo, Japan
Filed May 18, 1966, Ser. No. 551,029
Int. Cl. A01k 97/12, 93/00
U.S. Cl. 43—17                                    4 Claims

ABSTRACT OF THE DISCLOSURE

A condition responsive and indicating device for use with fishing gear to signal the presence of a fish on the fishing line. A switch is located at a remote location on the line and is electrically connected to a control which is responsive to condition changes caused by an opening and closing of the switch contacts.

---

The present invention relates to a condition responsive and indicating device. It is particularly adapted for use with fishing gear to indicate the presence of a fish on the fishing line.

In the past numerous attempts have been made to provide an indicating system capable of providing the desired information. These prior attempts have failed to gain widespread acceptance within the fishing community and they proved commercially unpractical. The prior devices were expensive. They required excessive power and high capacity components, such as lines, switches and the like. They were cumbersome and inconvnient to put to actual usage. Above all, they failed to solve the problem here achieved because they failed to provide an adequate response to the often delicate pull of a fish on the line.

This invention, therefore has as one of its main objects that of overcoming the aforenoted disadvantages of the prior art by providing a relatively inexpensive system which is both mechanically and electrically sensitive to condition changes being monitored. At the same time an objective is that of eliminating any requirement of excessive current carrying capacity in the various component parts without sacrificing in any respect the sought-for high efficiency of response.

In a broad sense the invention is directed to a condition responsive and indicating device which functions under the control of a switch means located at a remote location. Control means adapted to respond to changes in conditions being monitored are connected to the switching mechanism at times when the observed or happening conditions change and result in the closing of the switch contacts of the control. An amplifier circuit and an indicating device at a proximal location are energized through the switch to provide an electric current flow through the connecting means between a remote and proximal location thereby to provide an indication upon the occurrence of any condition changing event.

In the drawings which illustrate a preferred embodiment of the present invention and which form a part of the application and disclosure, FIG. 1 is a showing of a fishing rod and line assembly carrying thereon the signaling apparatus of the present invention;

FIG. 2 is a view of the fishing line having layers thereof broken away to show the particular construction;

FIG. 3 is an elevational view in cross-section of the switching mechanism;

FIG. 4 is a schematic view of the electric circuit and signaling device; and

FIG. 5 shows, partially in cross-section, the electrical connection between a pair of conducting wires and the terminals on the stationary base at the rod handle.

A fishing apparatus, generally denoted by the numeral 8, is shown in FIG. 1 and comprises a rod 10 of conventional construction having a handle portion 12 modified to the extend necessary to support and carry the electrical circuit components as schematically shown in FIG. 4. The fishing rod carries a reel 14 that is mounted on the handle portion in any convenient manner, as well-known in the prior art. A fishing line 16 forms a portion of an electrical circuit from the components within the handle to a remote switch. The line is wrapped about a reel in a manner whereby it may be shortened or extended according to the desires of the sportsman. As noted in FIG. 1, the line is positioned by a series of guides 18 conventionally supported by the rod. A switching mechanism, generally indicated by the numeral 20, is carried at a remote end of line 16. A line 22 is connected to the switch housing and a hook is connected at the end of the line.

The handle-supported reel of the fishing rod 10 carries a pair of terminals within its mounting member 24 for electrically connecting a responsive circuit to the switching mechanism. For reasons of size and circuit simplicity the transistorized circuit of FIG. 4 provides a convenient responsive unit which is easily carried within the handle 12.

The line 16 (see particularly FIG. 2) includes a synthetic fabric line portion 28 of insulating material, upon which a copper ribbon 30 is wound, preferably in helical fashion. This ribbon provides one conductive path from the transistorized circuit to the switch 20. A tubing 32 of fabric and also insulating material overlies the copper ribbon 30. A second copper ribbon 34 is also helically wound around the tubing thereby to provide a second conductive path from the transistorized circuit to the switch member. The helical winding maintains flexibility in the line. This assembly is thereafter provided with a top insulating layer or coating 36.

The specific matreials that are used to form the line do not form a basis of the present invention and therefore any material which will provide and display insulating qualities to prevent arcing or current paths between the respective ribbons may be used. Further, the outer coating must provide a barrier to maintain a water tight seal. It must be relatively flexible and inert to the action of both salt and fresh water.

The manner by which the switch member 20 is electrically connected to the condition responsive unit 26 is seen in FIG. 5. In this regard the reel 14 is in the form of a central core 1 of insulating material, for example, plastic. The core is provided, at its extremities, with a pair of discs 2 and 3 which may be conveniently mounted on the core or formed as an integral part thereof. As may be apparent, the discs 2 and 3 define the region within which the fishing line 16 may be wound.

The core is axially bored at both ends. As seen in the figure the bores terminate short of the middle of the core and may be threaded throughout a major portion of the bore length. Two connecting members 4 and 5 which are electrically insulated from each other are threaded into the respective bore openings to a position thereby to terminate short of the bore end and define a chamber area.

The reel 14 is rotatably supported by a mounting member 24 which is shown in FIG. 5 as including a pair of mounting plates supporting the connecting members 4 and 5 within an annular cutout portion. Both of the electrically conductive plates 24 are electrically insulated from each other. The reel 14 is provided with rotational impetus by means of a handle (not shown) carried by the connecting member 5.

A pair of contacts 6 and 7 are supported and fixedly mounted by the core 1. The contacts are of an extended length thereby to pass from the core surface inwardly of the core and into the chamber portions to be disposed adjacent the connecting members. For convenience, the chamber portion of the contacts may be resilient and biased in a direction toward the connecting members 4 and 5 thereby to be in intimate contact with the latter. The electrically conductive ribbons 30 and 34, within the fishing line 16, are individually connected to the contacts 6 and 7 and the mounting members 24 are electrically connected to a pair of terminals of the responsive unit carried within the handle portion 12 of the rod 10. Therefore, an electrical path between one contact of switch 20 and a terminal of the responsive unit 26 is defined by the ribbon 30, contact 6, connecting member 4, and mounting member 24. This electrical connection is assured regardless of the position the fishing reel may take.

The switch member 20 is generally of the reed type. It is enclosed in an outer casing member 38 which, in the preferred embodiment, is generally of cylindrical construction. The lower end of the casing, as seen in FIG. 3, is internally threaded at 40 to receive a plug member 42 which has a complementary external thread.

Formed on the plug is an ear 44 having an aperture 46 to which is secured the hook and line 22. The upper portion of the casing 38 is provided with an annular cutout that is externally threaded at 48. This upper portion is also formed with a shoulder 50 thereby to provide an upper abutting surface for a biasing member, as will be discussed hereinafter.

A second cap member 52 having an internal thread is received on the upper threaded portion of casing 38. The casing is annularly cut at the point of connection of the cap and therefore, a smooth continuation of the casing surface is provided. The cap 52 defines a seat for a pair of diametrically opposed and oppositely polarized magnets 45 and 56.

A shell 58, which also is of generally cylindrical configuration, is partially supported by and within the casing 38. The shell is preferably formed of a stainless steel material which is both electrically conducting and permeable to magnetic flux. Material of this type is well-known. The stainless steel shell, in turn, supports an evacuated glass envelope 60 wherein a pair of reed contacts 62 and 64 are mounted.

Both ends of the shell 58 are externally threaded at 66 and 68 to receive a retainer ring 72 and the overlying cap 70. The cap is also of a conductive material.

Prior to assembly of the switch, the line 16 is passed through the central aperture in cap 70 and one copper ribbon is electrically connected to terminal 74 within the cap. The other ribbon is electrically connected directly to reed contact 62. As noted, the other reed contact 64 is connected to terminal 76 provided at the base of the shell 58 thereby forming an electrical path from circuit 26, through ribbon 30, reed contact 62, reed contact 64, shell 58, terminal 74 and ribbon 34.

Once the electrical connection is established the envelope 60 is potted, by a suitable potting material, which is permeable to magnetic flux, within the shell 58 and cap 70. Spring 78, normally in tension, is mounted between the shoulder 50 in casing 38 and the retainer ring 72, and the switch is assembled in the obvious manner.

Therefore, in the rest or inoperative condition of the switch the casing and cap 52 are biased to the position in FIG. 3 whereby the magnets 54 and 56 are substantially removed from the reed contacts 62 and 64, with the latter remaining in the normally opened condition.

From the previous discussion it will be apparent that the switch operates to initiate the operation of a visual or audible indicator when a fish is hooked. Upon even a delicate fish pull the outer casing will move against the bias of spring 78. The magnets will move to the region of contacts 62 and 64, of annealed iron lead and suitably polarized to be repelled by the magnets, to close the same and establish the electrical path to circuit 26, as described.

The electrical circuit 26, FIG. 4, generally comprises a transistor 80 including a base 82, an emitter 84 and a collector 86. A source of electrical energy 88 has the positive terminal thereof connected to the emitter, with the negative terminal connected to one of the copper ribbons through resistance 90 and to the collector 86 through a relay coil 92, to define a common emitter hookup. The negative pole of power source 88 is also connected to one terminal of a normally opened relay switch 94. A signaling device, generally indicated by the numeral 96, is connected across the relay switch. It may provide either a visual or an audible signal, as desired. Upon the occurrence of a fish on the hook of line 22 the switch contacts 62 and 64 will close, as described. When switch 20 closes, the transistor 80 is rendered conducting. The output circuit including the collector and emitter then energizes relay 92, closing the relay switch 94 and the circuit to the signaling device 96. Upon energization of the signaling device the fisherman will immediately be apprised of the presence of a fish on the hook of line 22.

While the foregoing has been directed to a single embodiment of the present invention this discussion has been for the purposes of illustration and not for the purpose of limitation.

Having described the invention what is claimed is:

1. A condition responsive indicating and monitoring means adapted to be used with fishing gear comprising an electrically conducting and weight carrying line, a switch means including a pair of contacts adapted to open and close in response to changes in conditions being monitored, said switch means being controlled as to its open and closed state from one end of said line, a pole having a handle portion, a reeling device having a pair of terminals mounted on said handle portion, circuit means including a transistor and a sigaling unit supported within said handle portion and electrically connected to said terminals, said reeling device securing the other end of said line to said terminals whereby said switch and circuit means are in electrical connection, and control means for said switch means adapted to respond to monitored condition changes thereby to energize said signaling unit.

2. The condition responsive indicating and monitoring means of claim 1 wherein said control means includes magnetic means and said switch means comprises a conductive casing, a sealed insulating envelope housing said contacts and potted within said conductive casing, an outer casing, said magnetic means being mounted within said outer casing, and resilient means mounted between said conductive and outer casing to bias the casings to a first position, said magnetic means being connected to said outer casing whereby a condition change will cause a relative change of position of said casings from said first position to a second position thereby closing said switch contacts.

3. The condition responsive and indicating means of claim 2 wherein said insulating envelope is glass.

4. The condition responsive and indicating means of claim 1 wherein said line comprises an inner core, a pair of conductors helically wound on said core, means between said conductors for electrically insulating one from the other, and an outer covering adapted to both electrically insulate the line and provide a water-tight seal.

(References on following page)

References Cited

UNITED STATES PATENTS

| | | | |
|---|---|---|---|
| 648,505 | 5/1900 | Lindbohm | 43—18 |
| 1,522,471 | 1/1925 | Siino | 43—17 |
| 2,549,694 | 4/1951 | Leyda | 43—17 |
| 2,798,126 | 7/1957 | Burge | 43—17 X |
| 2,711,044 | 6/1955 | Woods | 43—17.6 |
| 3,308,569 | 3/1967 | Foellner et al. | 43—17.6 |

FOREIGN PATENTS 1,012,381  12/1965  Great Britain.

SAMUEL KOREN, Primary Examiner

DANIEL J. LEACH, Assistant Examiner

U.S. Cl. X.R.

43—17.1